United States Patent
Wenzel et al.

(10) Patent No.: US 11,679,782 B2
(45) Date of Patent: Jun. 20, 2023

(54) METHOD, SYSTEM AND VEHICLE FOR ASSISTING AN OPERATOR OF THE VEHICLE IN ASSESSING A TRAFFIC SITUATION WITH SHARED TRAFFIC SPACE

(71) Applicant: Honda Research Institute Europe GmbH, Offenbach/Main (DE)

(72) Inventors: Raphael Wenzel, Offenbach (DE); Malte Probst, Offenbach (DE); Tim Puphal, Offenbach (DE); Thomas Weisswange, Offenbach (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 194 days.

(21) Appl. No.: 17/159,126

(22) Filed: Jan. 26, 2021

(65) Prior Publication Data

US 2022/0234613 A1 Jul. 28, 2022

(51) Int. Cl.
*B60W 60/00* (2020.01)
*H04W 4/40* (2018.01)
(Continued)

(52) U.S. Cl.
CPC .. *B60W 60/0011* (2020.02); *B60W 30/18163* (2013.01); *B60W 50/14* (2013.01);
(Continued)

(58) Field of Classification Search
CPC ....... B60W 60/0011; B60W 30/18163; B60W 50/14; B60W 2554/4041; B60W 2552/05; B60W 2552/10; H04W 4/40
(Continued)

(56) References Cited

U.S. PATENT DOCUMENTS

| 8,810,431 B2 | 8/2014 | Mudalige et al. |
| 10,062,288 B2 | 8/2018 | Litkouhi et al. |

(Continued)

FOREIGN PATENT DOCUMENTS

| EP | 3118836 | 1/2017 |
| WO | WO-2017180382 A1 * | 10/2017 |
| WO | WO-2019115839 A1 * | 6/2019 ............. G01S 17/10 |

OTHER PUBLICATIONS

Ning et al.,"Adaptive Dynamic Preview Control for Autonomous Vehicle Trajectory Following with DDP Based Path Planner," 2015, Publisher: IEEE.*
(Continued)

*Primary Examiner* — Tuan C To
(74) *Attorney, Agent, or Firm* — JCIPRNET

(57) ABSTRACT

A method and system for assisting operation of an ego-vehicle in the traffic situation with shared traffic space is provided, in which a future path for the ego-vehicle and a future path for another traffic participant and a relevant path corridor for each determine future path is determined. Based thereon, an overlap of the path corridors to define a shared traffic space is determined and individual distance measures between the ego-vehicle and the shared traffic space and between the other traffic participant and the shared traffic space are calculated to determine an asymmetry. Based on the asymmetry an order is determined and (partially) automated in accordance with trajectory determined based on the order, or information on the intended passing order is provided to the ego-vehicle driver.

17 Claims, 6 Drawing Sheets

(51) Int. Cl.
*B60W 30/18* (2012.01)
*B60W 50/14* (2020.01)
(52) U.S. Cl.
CPC .......... *H04W 4/40* (2018.02); *B60W 2552/05* (2020.02); *B60W 2552/10* (2020.02); *B60W 2554/4041* (2020.02)
(58) Field of Classification Search
USPC .......................................................... 701/27
See application file for complete search history.

(56) References Cited

U.S. PATENT DOCUMENTS

| | | | | |
|---|---|---|---|---|
| 10,196,058 | B2* | 2/2019 | Paris | B60W 30/09 |
| 10,286,913 | B2 | 5/2019 | Saigusa et al. | |
| 10,543,852 | B2* | 1/2020 | Marcoux | B60W 50/0097 |
| 10,650,675 | B2* | 5/2020 | Saito | B60Q 1/543 |
| 10,857,849 | B2* | 12/2020 | Toyoda | G06N 20/00 |
| 10,919,542 | B2* | 2/2021 | Ahmed | B60W 30/18163 |
| 10,994,747 | B2* | 5/2021 | Augst | B60W 50/10 |
| 11,072,327 | B2* | 7/2021 | Hardy | G06V 20/588 |
| 11,390,288 | B2* | 7/2022 | Takei | B60W 30/12 |
| 2013/0018572 | A1* | 1/2013 | Jang | G08G 1/164 |
| | | | | 701/119 |
| 2013/0116915 | A1 | 5/2013 | Ferreira et al. | |
| 2017/0240098 | A1* | 8/2017 | Sweeney | B60Q 1/381 |
| 2017/0334446 | A1* | 11/2017 | Bosch | B60W 50/10 |
| 2018/0043897 | A1* | 2/2018 | Hashimoto | G08G 1/167 |
| 2021/0129863 | A1* | 5/2021 | Nattermann | G01C 21/3658 |
| 2021/0146964 | A1* | 5/2021 | Rus | B60W 60/0015 |
| 2021/0309223 | A1* | 10/2021 | Zhu | B60W 60/0027 |
| 2022/0161821 | A1* | 5/2022 | Shi | G08G 1/167 |
| 2022/0204030 | A1* | 6/2022 | Nishimura | B60W 30/09 |

OTHER PUBLICATIONS

Jiaoyang Li, et al., "New Techniques for Pairwise Symmetry Breaking in Multi-Agent Path Finding," Proceedings of the Thirtieth International Conference on Automated Planning and Scheduling, vol. 30, Jun. 2020, pp. 193-201.

Maximilian Naumann, et al., "Generating Comfortable, Safe and Comprehensible Trajectories for Automated Vehicles in Mixed Traffic," Proc. IEEE Intl. Conf. Intelligent Transportation Systems (ITSC), Nov. 2018, pp. 1-8.

* cited by examiner

US 11,679,782 B2

METHOD, SYSTEM AND VEHICLE FOR ASSISTING AN OPERATOR OF THE VEHICLE IN ASSESSING A TRAFFIC SITUATION WITH SHARED TRAFFIC SPACE

TECHNICAL FIELD

The invention is in the field of assisted driving of vehicles, and, in particular, control of at least partially automated driving vehicles in situations where a driving order of traffic participants passing a shared traffic space needs to be determined.

BACKGROUND

Recent developments already improved assistance of vehicle drivers in driving their vehicles to a large extent. This includes partially or fully automated driving of vehicles based on situation analysis that allows to predict the behavior of other vehicles or traffic participants. Based on the perception of the environment of an ego-vehicle, a decision is made how to control the ego-vehicle in order to fulfill the driving task. However, there are many situations that may lead to ambiguous situations. One example is a narrow passage of a road, where only a single car may pass at a time. In such a situation, it is necessary to determine an order in which vehicles approaching to the narrow passage may pass this shared traffic space. In the absence of any traffic rules applicable to solve this problem, humans solve these situations by means of cooperative interaction.

Autonomous vehicles make decisions based on the most likely prediction of the other vehicle's movement. In case of two vehicles approaching a passage on a road where only a single vehicle may pass, the situation analysis may be ambiguous. The other traffic participant can either let the ego-vehicle pass the shared space by waiting, or drive itself first. In case that the ego-vehicle is equipped with an advanced driving assistance system for automated or partially automated driving, it is thus difficult to decide on its own behavior. To avoid dangerous situations, known systems in autonomous vehicles are configured to act according to a cautious default behavior, which means such vehicles or even entirely stop and always let the other vehicles pass. This leads to unnecessary waiting times and might even confuse human drivers of other cars, because such cautious behavior contradicts their own expectations. Alternatively, the autonomous vehicle might make assumptions about the others' behavior. However, this might lead to dangerous situations or so-called "deadlocks" as there are no simple options to correct behavior once the vehicle entered the shared space.

These problems are caused by lack of a model of interaction between the involved traffic participants, which allows to interpret the other vehicles' movement in order to find to which extent the involved traffic participants (ego-vehicle's assistance system and at least one other traffic participant) have a common understanding of the currently experienced situation and based thereon may achieve a mutual solution.

A system overcoming the above-mentioned problem is disclosed in U.S. Pat. No. 8,810,431 B2. According to the system, a vehicle is equipped with a processor determining its position and path of travel, and position and path of the other vehicle. Based on predictions of the future paths of the involved vehicles, a time to intersect is determined. To avoid critical situations, the system is configured to negotiate with the other traffic participant and, based on the outcome of such active negotiation between the involved vehicles, the merging maneuvers are executed. However, the system requires that all involved traffic participants are equipped with a system capable of executing such a negotiation. Until all or at least the majority of vehicles is equipped with such a system capable of negotiating, the system will only have a minor effect on safety and comfort.

Thus, there is still the need for a method and system in a vehicle that allows to find a suitable order for vehicles passing a shared traffic space and that does not require vehicle-to vehicle-communication between same or similar systems.

SUMMARY

The method according to a first aspect, the system according to a second aspect, and the vehicle the according to a third aspect having the system mounted address these issues.

The method for assisting operation of an ego-vehicle in a traffic situation with shared traffic space according to a first aspect of the invention, comprises: determining a future path for the ego-vehicle and a future path for another traffic participant; determining a relevant path corridor for each determined future path; determining an overlap of the path corridors to define a shared traffic space; calculating individual distance measures between the ego-vehicle and the shared traffic space and between the other traffic participant and the shared traffic space; evaluate the individual distance measures to determine an asymmetry; determine an intended passing order based on the asymmetry; and determine a future trajectory for the ego-vehicle based on the intended passing order and generate control signals for executing automated or partially automated driving in accordance with the determined trajectory; or providing information on the intended passing order to the ego-vehicle driver.

The system according to a second aspect of the invention comprises a processor configured to carry out above mentioned method steps, and further actuators so that a determined future trajectory can be executed based on the control signals generated by the processor. Alternatively, the system may use signaling means like a display, horn or vehicle lamps for providing information on the intended passing order to the ego-vehicle driver other traffic participants.

A vehicle according to a third aspect of the present invention comprises the above-mentioned system for automated driving, partially automated driving or at least informing the driver on a suggested order for passing the shared traffic space.

BRIEF DESCRIPTION OF THE DRAWINGS

In the figures, same reference signs denote same or corresponding elements. A repetitive discussion of elements

DETAILED DESCRIPTION

Figure 1:
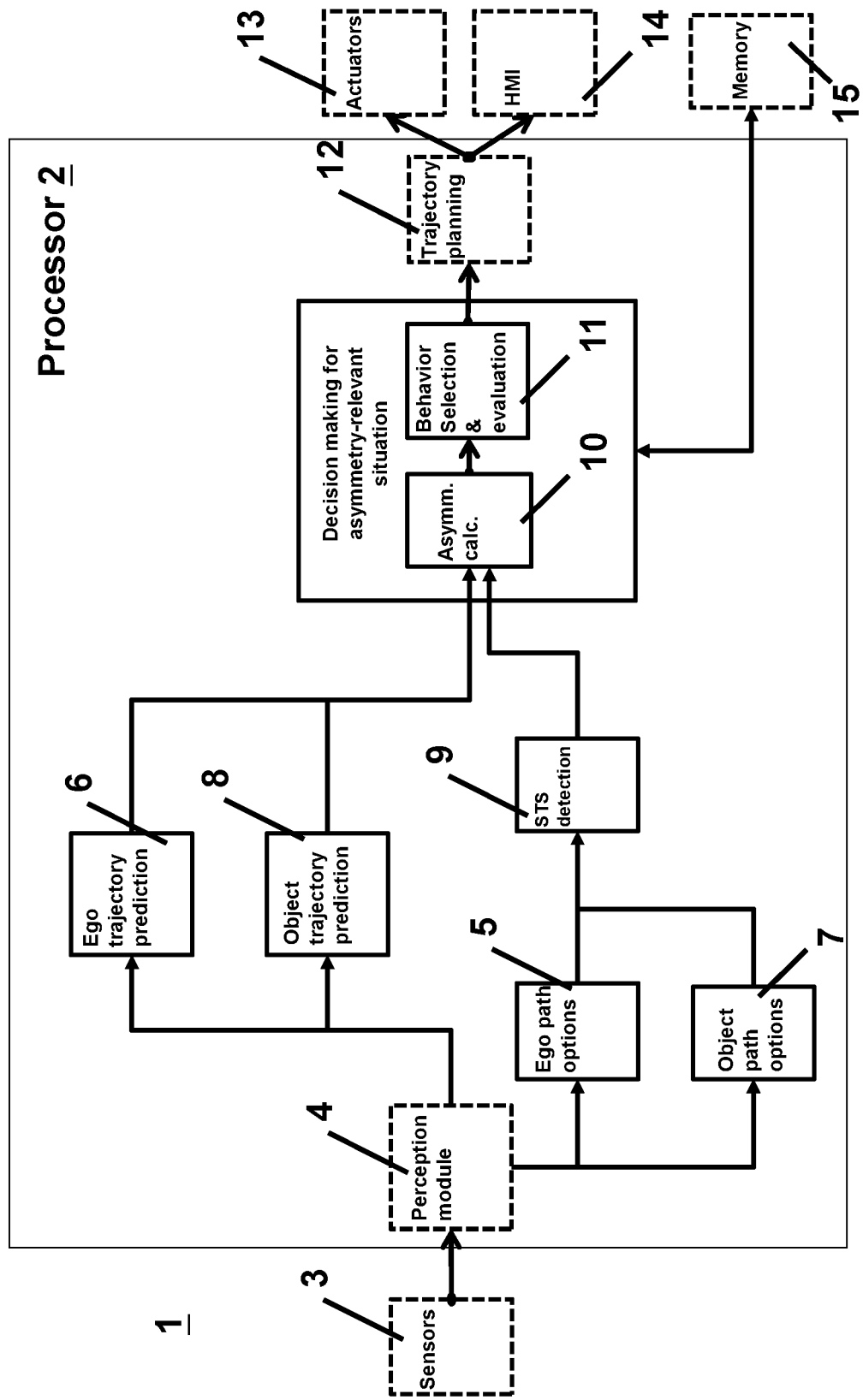
FIG. 1 shows a block diagram as an overview over the system according to the present invention.

Compared to prior art, the present invention has the great advantage that interaction between involved traffic participants via vehicle-to vehicle-communication is not necessary to determine a driving order. The upcoming situation, where the plurality of traffic participants have to pass the same area (shared traffic space) is thus comfortably resolved by the system executing the proposed method and a vehicle equipped with such a system. The system can determine, for the recognized situation and identified shared traffic space, an order in which the involved traffic participants may pass the shared traffic space solely based on its own perception of the environment and situation. Since the outcome of the analysis provides an intended passing order, which is then used to determine the further behavior and planning of a corresponding trajectory for the ego-vehicle, a solution for such a situation is achieved rather than only avoiding any risk by waiting until the situation resolves itself over time.

It is particularly advantageous that the individual distance measures are calculated as distances between a vehicle/traffic participant and its respective entry point into the shared traffic space. This means that the ego-vehicle and the other traffic participant may have different entry points into the shared traffic space. The shared traffic space is an area in which the positioning of one vehicle/traffic participant limits the capability of a second vehicle/traffic participant to pass this area. This area is determined based on information on a drivable area and path information for the involved traffic participants (ego-vehicle and at least one further traffic participant). Determination of the shared traffic space will be explained later in greater detail with reference to FIG. 2.

The evaluation and, thus, determination of asymmetries for a situation may be stored in a memory 15 of the system 1. Storing asymmetries previously determined allows to analyze the history and, thus, infer from an evolvement of asymmetries a degree of mutual agreement on a determined intended passing order. Since the asymmetry takes into account the individual distance measures of the ego-vehicle and the other traffic participant to their respective entry points into the shared traffic space, it will become evident from a change in the recalculated asymmetry when the other traffic participant's understanding does not correspond to the ego-vehicle's understanding. Recalculating the asymmetry allows to react on such a lack of agreement. This could lead to an adaptation of a future trajectory determination by adapting a behavior or by selecting an entirely different behavior.

The shared traffic space is advantageously determined based on information obtained by sensing the environment of the ego-vehicle. Such sensing may include using any sensors like for example RADAR, LIDAR, cameras, or the like, but also vehicle-to-vehicle or vehicle-to-infrastructure communication. Thus, the system may comprise at least one communication unit allowing the system to communicate with other vehicles comprising similar communication units, or traffic infrastructure. It is to be noted that contrary to other known systems such a vehicle-to vehicle-system as used in the present invention may be limited to provide vehicle state information, e.g. position, velocity, etc. for other systems.

Further, it is possible to make use of the determined asymmetry and resulting determined intended passing order not only by internal further processing of the information but also by signaling the intended passing order to the other involved traffic participant. This is specifically advantageous, because the system is applicable in arbitrary traffic situations with other traffic participants not having mounted a comparable system on their vehicle. Thus, the outcome of the analysis and determination made by the ego-vehicle provided by signaling may advantageously confirm for the other traffic participants the situation understanding or may immediately warn the other traffic participant in case that the ego-vehicle and the other traffic participant have different understanding of the current situation.

The invention will now be explained in greater detail with reference to FIG. 1. The system 1 as shown as a block diagram may be mounted on an ego vehicle for assisting the driver of the ego-vehicle. The assistance of the driver of the ego-vehicle may be performed either by communicating with the driver of the ego-vehicle, executing partially automated driving or executing fully automated driving. The system 1 may comprise processing means, which could be realized as a single processor 2, but also by a plurality of processors being connected to each other for performing individual calculations. The system 1 comprises on or a plurality of sensors 3, for example, a camera, RADAR, LIDAR and GNSS. Further, the sensors 3 can include a communication unit or interfaces for performing vehicle-to-vehicle and/or vehicle-to-infrastructure communication for obtaining information about the environment of the ego-vehicle. Additionally, the sensors 3 can include internal vehicle sensors like interior sensors, which monitor the driver of the vehicle or perform eye/head tracking.

From the output sensor signals, the perception module 4 derives semantic information about the environment. Such semantic information may be detection and tracking of cars, lane markings, extraction of map paths at the current position, etc. The sensors 3 are thus used to obtain information based on which the perception module 4 can analyze a currently experienced traffic situation. The information extracted by the perception module 4 from the input signals allows determining, in an ego path determination module 5, an ego future trajectory. The ego future trajectory can be determined based on predefined map positions, a current or previous trajectory planning step, extrapolation of the past vehicle trajectory, or estimated from current and previous actions of the ego-vehicle's driver. Such current and previous actions comprise steering maneuvers, gas/brake pedal usage, base patterns, etc. It is to be noted that for the present invention any method that allows to determine (estimate) one or more future paths of the ego-vehicle may be used. In case that the plurality of future ego paths are determined in the ego path determination unit 5, these different path options may be associated with probabilities.

Additionally, the information provided by the perception module 4 is supplied to an ego trajectory prediction unit 6 for predicting an ego trajectory. The prediction can cover a fixed constant future time or, alternatively, the duration of the prediction can be adjusted. The adjustment may be performed in response to driving conditions such as weather, ego-vehicle velocity, currently performed maneuver (for example, lane change, vehicle following), autonomy state of the ego-vehicle (for example, fully driver controlled, lateral/longitudinal control only, fully automated driving, etc.) or traffic amount. Further, the uncertainty of this prediction may be also taken into consideration when defining the prediction duration.

The information output by the ego path determination unit 5 and the ego trajectory prediction unit 6 can include their respective uncertainties, reflecting, for example, the ego position sensor uncertainty or lane detection uncertainty, ego trajectory/path prediction method, history of human driving inputs or ego-vehicle positions, prediction distance from current time, accuracy of vehicle control in following a target trajectory, etc.

A similar determination of one or more traffic participants' future paths and trajectory prediction for the other traffic participant is performed in the traffic participant path determination unit 7 and the traffic participant trajectory prediction unit 8, respectively. The trajectory prediction of the other traffic participant may use an extrapolation of the past vehicle trajectory (ballistic, model based or combined) and/or a prediction of lane changing/keeping behavior using features such as blinker activation, or scene context, for example, approaching a slower vehicle.

As explained above already for the ego future path and ego future trajectory prediction, a plurality of paths and trajectories may be predicted, each being assigned a probability of realization.

The prediction with respect to other traffic participants may be performed for any traffic object that is identified in the perception module 4. However, it is advantageous to restrict the prediction to relevant vehicles in the vicinity of the ego-vehicle. The restriction may specifically allow prediction for traffic participants on next left, next right and current ego lane and both in front of, next to and behind the ego-vehicle with a certain maximum distance or time related measure. The time related measure might be the time to contact TTC. In case of an active or predicted ego lane change this might be extended to vehicles or other traffic participants on the lane next to the target lane of the ego-vehicle.

While for the details of the above given aspects on analyzing an environment of the ego-vehicle thereby determining objects and their states in the vicinity of the ego-vehicle, trajectory prediction, and the like, solutions exist in the prior art, the invention uses a novel detection of a shared traffic space. The following explanation will be given for a single ego future path and a single traffic participant future path. It is evident, that based on the plurality of path options similar calculations and determinations of the shared traffic space may be performed. For excluding some of the determent path options the probability for realization of the path may be used.

Figure 2:
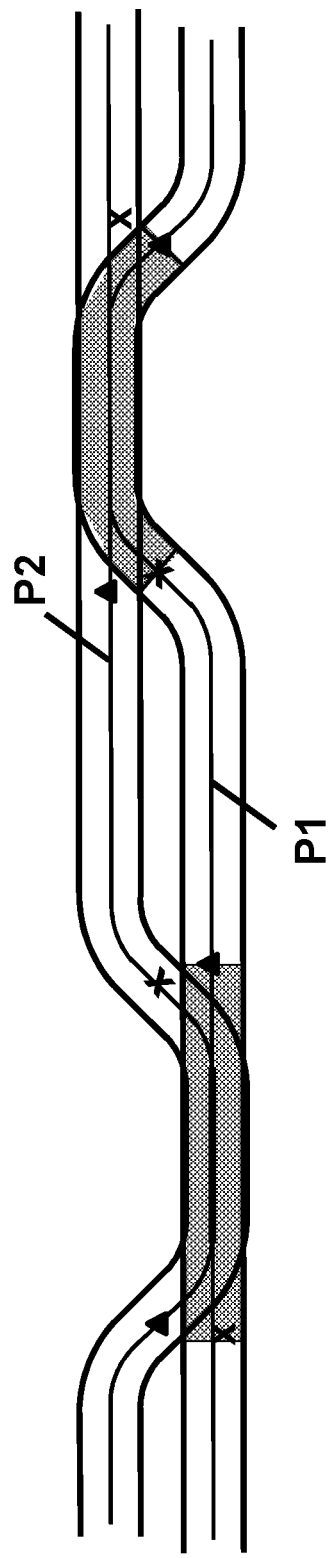
FIG. 2 shows examples for determining shared traffic spaces based on future paths of vehicles.

The determination of the shared traffic space will now be explained with reference to FIG. 2. A first path is denoted with P1 and is a future path of the ego vehicle. A second path is denoted with P2 and is the future path of another traffic participant. To each of the paths P1, P2, a corridor is assigned indicating, for example, a width of the respective traffic participant, for example, the ego-vehicle. The corridor is indicated in the drawing by path outlines parallel to the path P1, P2. While in the middle section the ego vehicle and the other traffic participant may well pass each other, there are two areas where due to some circumstances, for example, a parked car, both traffic participants may be forced to use the same drivable area. The shared traffic space is, as can be seen in the drawings, a section of the corridor of the path of the ego-vehicle or the other traffic participant, which, at least partially, overlaps, with the corridor of the other traffic participant. It is to be noted that in the drawing the shared traffic space is illustrated for one vehicle, which is driving straight in the left part of the drawing and performs an evasive maneuver in the right part of the drawing. As it can be seen from the markings on the path P2 the entry point and the exit point for the other vehicle are different, although the other vehicle has a corresponding shared traffic space.

Depending on the direction in which the vehicle drives, the vehicle first approaches an entry point into the shared traffic space and leaves the shared traffic space at the respective exit point. It is evident, that in a situation, where the ego vehicle and the other traffic participant have different driving directions, the entry point of the one vehicle does not coincide with the entry point of the other vehicle. In the example, entry points and exit points are indicated with crosses and triangles. The shared traffic space is determined based on the outputs of the ego path determination unit 5 and the other traffic object path determination unit 7 in a shared traffic space detection module 9.

In order to be able to determine an intended passing order for the involved vehicles (ego-vehicle and other traffic participant) to pass the shared traffic space, and asymmetry for currently experienced traffic situation is determined in an asymmetry computation module 10. The asymmetry computation module 10 is provided with the output of the shared traffic space detection module 9 and the ego trajectory prediction unit 6 as well as the traffic object prediction unit 8. In the asymmetry a computation module 10, a distance measure is calculated, which is a measure of how close the ego vehicle or the other traffic participant is to its respective entry point to the shared traffic space. It is to be noted that the term "distance measure" is not limited to the spatial distance but also includes timing aspects. The distance measure is determined based on the vehicle states relative to the entry point in the shared traffic space. The distance measure is, for example, determined based on position, spatial distance, a velocity vector, acceleration vector and may include received signals by means of communication devices like vehicle-to-vehicle communication or vehicle-to-infrastructure communication. Examples for such a distance measure are a time to entrance TTE using a constant velocity prediction, or a Euclidean distance to the entrance in low velocity scenarios.

After computing the distance measure for the ego vehicle and the other traffic participant, an asymmetry a can be calculated from a comparison (difference) of the calculated distance measures:

$$a = \Delta TTE = TTE_{ego} - TTE_{other} \text{ with}$$

$$TTE_{ego} = \frac{d_{ego}}{v_{ego}}, TTE_{other} = \frac{d_{other}}{v_{other}}$$

In the above given formulas $TTE_{ego}$ and $TTE_{other}$ denote the time to the entry point in the shared traffic space of the ego-vehicle or the other vehicle, $\Delta TTE$ denotes the difference between $TTE_{ego}$ and $TTE_{other}$, and $d_{ego}$ and $B_{other}$ denote the distance measures as mentioned above.

As it can be seen directly from the above formulas, the asymmetry a is zero when the distance measure for both involved vehicles is equal. This means that the remaining time until the respective entry point of the shared time traffic space is reached by the ego-vehicle and the other traffic participant is equal. On the other hand, if the distance measure for one of the vehicles is significantly higher than for the other vehicle, the asymmetry a will increase. In such highly asymmetric situations, it is easier to resolve the situation. In such a case the most probable future order of passing the shared traffic space is obvious for both involved traffic participants, regardless of the exact means of their underlying sensory or decision-making process. Contrary, in highly asymmetric situations, the most probable future order is less clear or even entirely unclear to the involved traffic participants.

Figure 3:
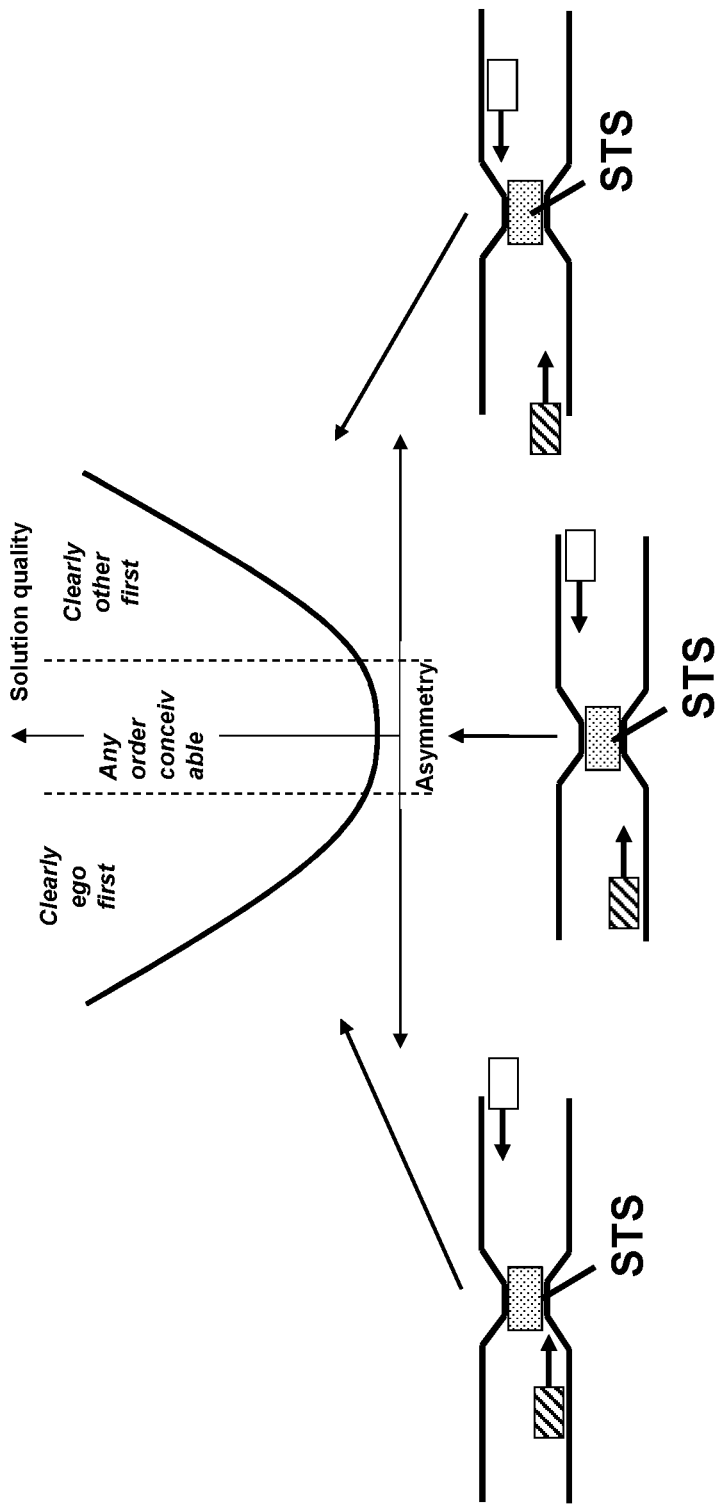
FIG. 3 is a diagram illustrating the influence of asymmetry on the determined intended passing order.

Based on the calculated asymmetry a, the intended passing order for passing the shared traffic space is determined. In case that $TTE_{ego}$ exceeds $TTE_{other}$, the determent intended passing order is that the other traffic vehicle will pass the shared traffic space before the ego-vehicle. In case that $TTE_{other}$ exceeds $TTE_{ego}$, the ego vehicle will pass the shared traffic space before the other traffic vehicle. The achieved solution will be the better, the greater the difference between $TTE_{ego}$ and $TTE_{other}$ is. This is illustrated in FIG. 3.

Once the asymmetry a has been calculated in the asymmetry computation module 10, the asymmetry a is forwarded to a behavior selection and evaluation module 11. In case that it can be derived from the asymmetry a that the ego vehicle shall pass the shared traffic space first, the behavior to be executed might be determined on the assumption that the other traffic participant will let the ego-vehicle pass. They already started behavior may thus be continued by the ego-vehicle. Contrary, when an intended passing order is determined to let the other traffic participant pass the shared traffic space first, the behavior selected in the behavior selection and evaluation module 11 is changed to stop or slow down the ego-vehicle. Based on the determined asymmetry a, the expected prediction of the other traffic participant is changed.

Once the behavior has been selected, and a future trajectory for the ego vehicle is determined based on the selected behavior and thus, in the end on the determined intended passing order, further control signals are generated for being executed by actuators 13 (e.g. steering, throttle, brakes) for automated or partially automated driving of the ego vehicle in accordance with the determined trajectory. In case that the assistance system 1 is only intended to provide information to an operator of the ego-vehicle, the information may be output by a human machine interface, for example a display.

Specifically for situations where the initially determined intended passing order is based on small values of the asymmetry a, it is helpful that the asymmetry a is constantly recalculated. Previously calculated asymmetry a for the situation is stored in a memory 15. Thus, if the situation evolves, it may either be recognized that the absolute value of the asymmetry a decreases, or that the absolute value of the asymmetry a increases. In the latter case, the selected behavior was correct in terms of mutual agreement with the other traffic participant's understanding of the situation. Contrary, in case that the absolute value of the asymmetry a decreases (or even if asymmetry a is constant), it is concluded that the other traffic participant and the ego-vehicle seem to have chosen a different order for passing the shared traffic space. Monitoring the change of the calculated asymmetry a can thus leads to an adaptation of the selected behavior.

Figure 4:
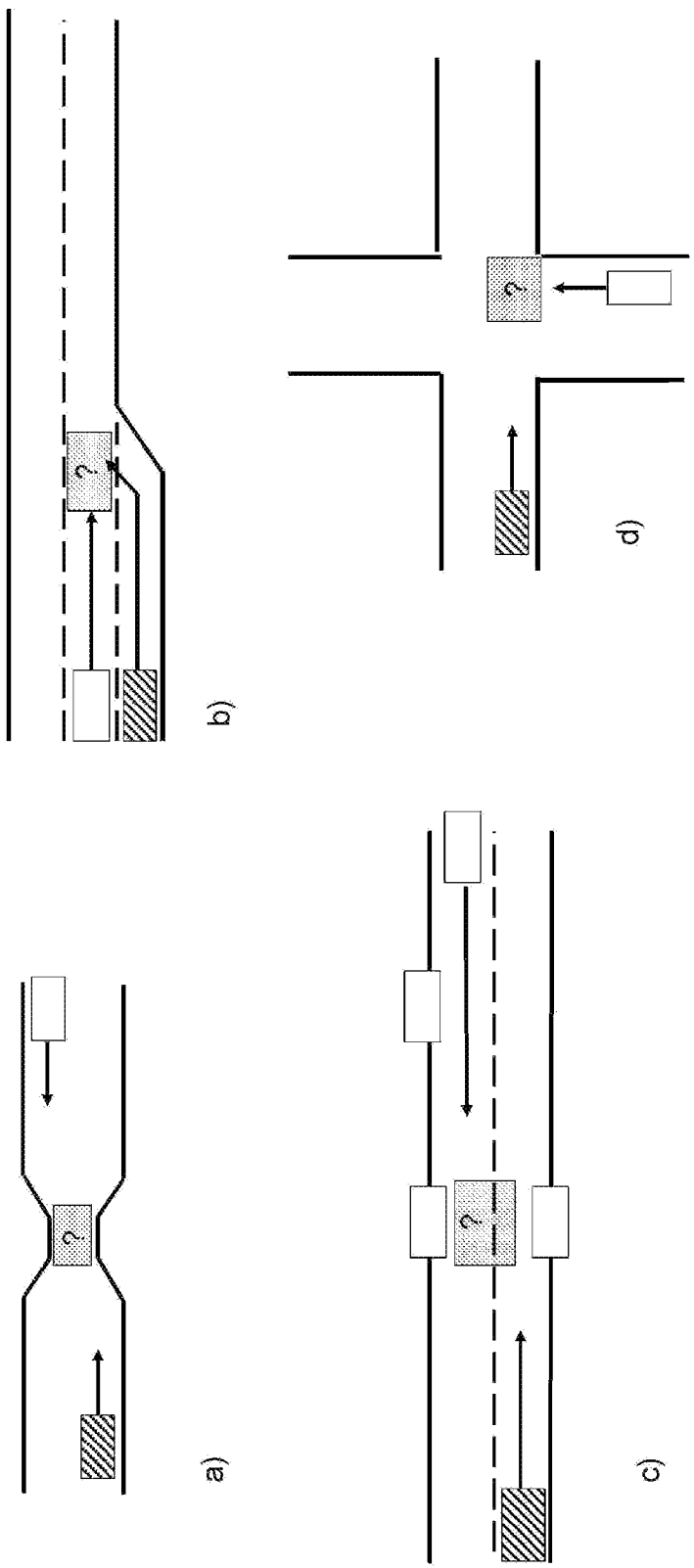
FIG. 4 shows a plurality of examples of traffic situation that benefit from the present invention.

FIG. 4 shows some examples which benefit from taking into consideration an asymmetry a of a traffic situation when selecting a behavior and determining the future trajectory for the ego vehicle. FIG. 4*a*) shows a narrow passage with two vehicles approaching the narrow passage in opposite directions. This situation corresponds to the ones used for showing the solution quality in FIG. 3.

FIG. 4*b*) shows a situation where one of two neighboring lanes ends so that the hatched vehicle needs to change lane. FIG. 4*c*) shows a situation where a narrow passage of a road is caused by parked cars. Finally, FIG. 4*d*) illustrates an unregulated crossing. As these 4 exemplary situations reveal, the involved vehicles enter the shared traffic space at different positions and these respective entry points into the shared traffic space are used for determining the distance measure of the ego-vehicle and the other traffic participant. In the illustrated examples, the shared traffic space is indicated by the rectangles including the question mark.

Figure 5:
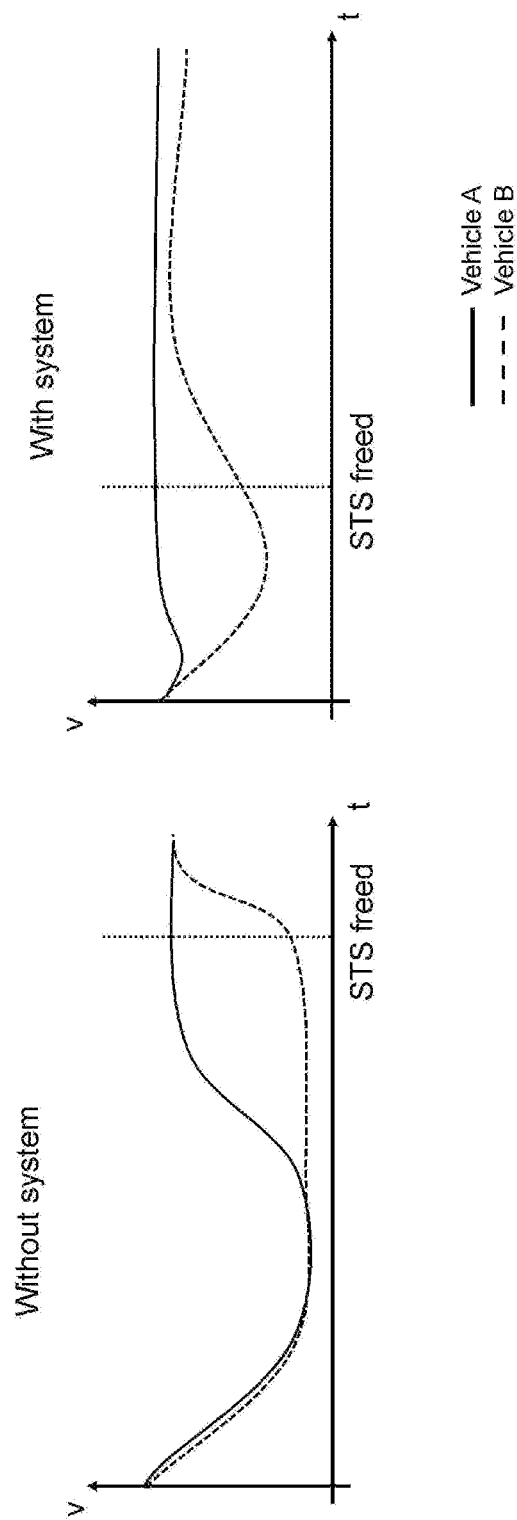
FIG. 5 illustrates the advantage achieved for the traffic flow.

The effect of taking into consideration the asymmetry a of the traffic situation can be shown with the graphs depicted in FIG. 5. On the left side, the graph shows the velocity of the ego vehicle and the other traffic participant over time. Known systems will automatically approach the shared traffic space and slow down the vehicle in order to avoid any risk. Consequently, it takes a lot of time until the situation is resolved and one of the vehicles accelerates to pass the shared traffic space, thereby freeing at some point in time the shared traffic space so that the other car may accelerate and pass, too. The illustration in FIG. 5 shows a situation in which both involved vehicles are equipped with inventive system 1. However, since the system's solution is close to the human expectation, the system provides benefit in most situations with humans involved. Similarly, if the system encounters a different system, the explicit solution provided by the inventive system 1 may help the other system to find the same outcome as the inventive system 1 and, thus, provide the illustrated benefit.

Contrary, with the present invention, the asymmetry a let's vehicle A pass the shared traffic space with almost no deceleration, because it determined to be the first to pass the shared traffic space. Thus, the time until we had lay freed the shared traffic space is significantly smaller than without the system. This can easily be recognized by the driver of the other vehicle which may, as a consequence accelerated earlier. The overall time until both vehicles have passed the shared traffic space is therefore significantly reduced which leads to an improved traffic flow.

It is to be noted that the units and modules explained with reference to FIG. 1 may advantageously be realize in software.

Figure 6:
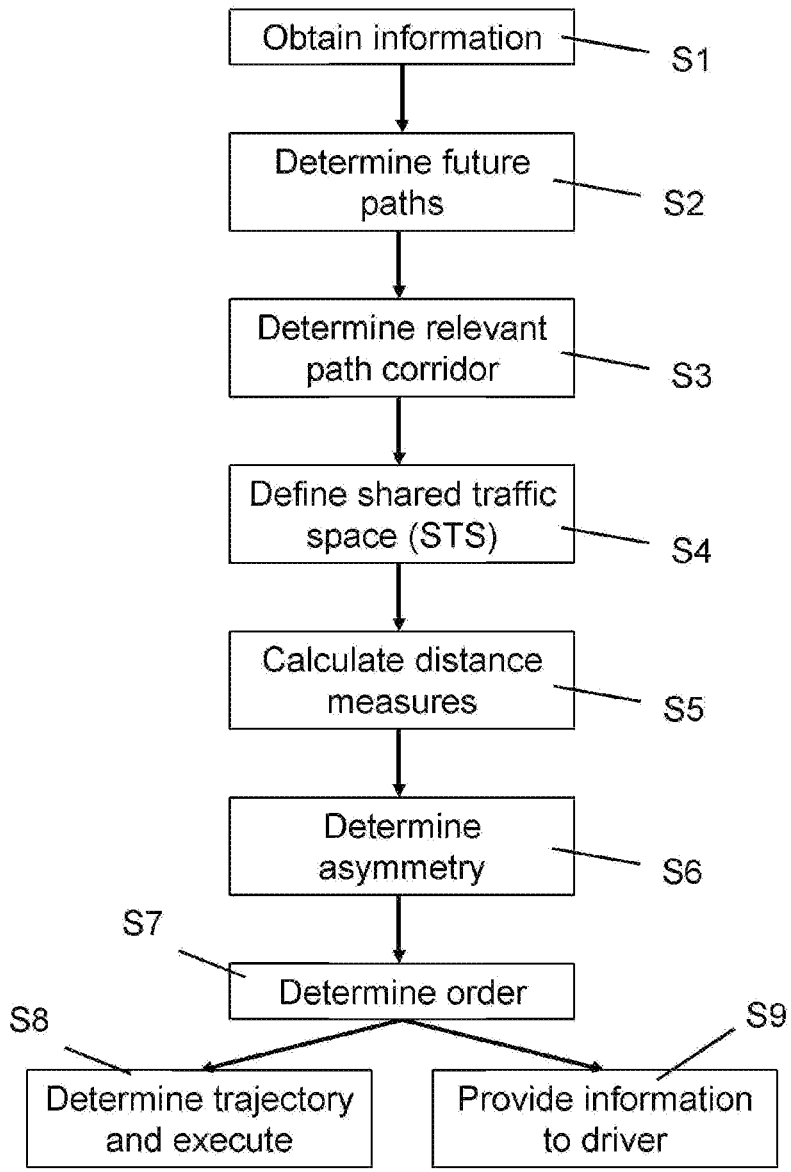
FIG. 6 is a simplified flowchart illustrating the main method steps according to the invention.

The main method steps that have been explained in greater detail above shall now be summarized with the simplified flowchart of FIG. 6.

First, in step S1 the system 1 obtains information on the environment of the system 1. Then, based on the obtained information, the future path for the ego-vehicle and the future path for the other traffic participant are determined in step S2. For the determined paths, corridors are calculated indicating a width around the paths that is required for the ego-vehicle or traffic participant following their determined paths.

An overlap of the path corridors is calculated in step S4 to define a shared traffic space. The overlap may be a partial overlap or a complete overlap. Individual distance measures between the ego-vehicle and its entry point into the shared traffic space, and between the other traffic participant and its respective entry point into the shared traffic space are calculated in step S5. In step S6, the individual distance measures are evaluated to determine an asymmetry a, before an intended passing order is determined based on the asymmetry a in step S7.

After the asymmetry is determined, which describes the preference of one traffic participant passing the shared traffic space before the other, a future trajectory for the ego-vehicle based on the intended passing order is determined and control signals for executing automated or partially automated driving in accordance with the determined trajectory are generated in step S8. Alternatively or additionally, information on the determined intended passing order is provided to the ego-vehicle driver in step S9.

What is claimed is:

1. A method for assisting operation of an ego-vehicle in the traffic situation with shared traffic space, the method comprising:
   determining a future path for the ego-vehicle and a future path for another traffic participant;
   determining a relevant path corridor that is assigned to the each determined future path, wherein the relevant path corridor indicates a width of the respective traffic participant;
   determining a shared traffic space as an overlap of the path corridors;
   calculating individual distance measures between the ego-vehicle and the shared traffic space and between the other traffic participant and the shared traffic space;
   evaluating the individual distance measures to determine an asymmetry;
   determining an intended passing order based on the asymmetry;
   determining a future trajectory for the ego-vehicle based on the intended passing order and generating control signals for executing automated or partially automated driving in accordance with the determined future trajectory; and
   controlling the ego-vehicle to drive in accordance with the determined future trajectory based on the generated control signals.

2. The method according to claim 1, wherein
   the individual distance measures are calculated as distances between the ego-vehicle and the ego-vehicle's entry point to the shared traffic space and the other traffic participant and the other participant's entry point to the shared traffic space.

3. The method according to claim 1, wherein
   the determination of the asymmetry is constantly repeated.

4. The method according to claim 1 further comprising:
   storing the determined asymmetries of a situation relative to a shared traffic space;
   analyzing a change over time from the stored asymmetries;
   determining a degree of mutual agreement on the intended passing order based on the change over time from the stored asymmetries; and
   adapting the future trajectory determination based on the degree of mutual agreement.

5. The method according to claim 1, wherein
   the determination of the shared traffic space is based on information obtained by sensing the environment of the ego-vehicle.

6. The method according to claim 5, wherein
   the sensing of the environment is performed by vehicle-to-vehicle or vehicle-to-infrastructure communication.

7. The method according to claim 1, wherein
   at least the determined intended passing order or the respectively intended behavior is signaled by the ego-vehicle to the other traffic participant.

8. A system for assisting operation of an ego-vehicle in the traffic situation with shared traffic space, comprising a processor configured to:
   determine a future path for the ego-vehicle and a future path for another traffic participant;
   determine a relevant path corridor that is assigned to the each determined future path, wherein the relevant path corridor indicates a width of the respective traffic participant;
   determine a shared traffic space as an overlap of the path corridors;
   calculate individual distance measures between the ego-vehicle and the shared traffic space and between the other traffic participant and the shared traffic space;
   evaluate the individual distance measures to determine an asymmetry;
   determine an intended passing order based on the asymmetry; and
   determine a future trajectory for the ego-vehicle based on the intended passing order and generate control signals for executing automated or partially automated driving in accordance with the determined future trajectory;
   wherein the system further comprises
   at least actuators for controlling the ego-vehicle to drive in accordance with the determined future trajectory based on the generated control signals.

9. The system according to claim 8, wherein
   the processor is configured to calculate individual distance measures as distances between the ego-vehicle and the ego-vehicle's entry point to the shared traffic space and the other traffic participant and the other participant's entry point to the shared traffic space.

10. The system according to claim 8, wherein
    the processor is configured to constantly repeat the determination of the asymmetry.

11. The system according to claim 8, wherein
    the system comprises a memory, and
    the processor is further configured to:
      store determined asymmetries of a situation relative to a shared traffic space;
      analyze a change over time all the stored asymmetries;
      determine a degree of mutual agreement on the intended passing order based on the change over time from the stored asymmetries; and
      adapt the future trajectory determination based on the degree of mutual agreement.

12. The system according to claim 8, wherein
    the system comprises sensors for sensing the environment of the ego-vehicle.

13. The system according to claim 12, wherein
    the sensors comprise communication interfaces for performing vehicle-to-vehicle or vehicle-to-infrastructure communication.

14. A vehicle equipped with the system according to claim 8.

15. A method for assisting operation of an ego-vehicle in the traffic situation with shared traffic space, the method comprising:
    determining a future path for the ego-vehicle and a future path for another traffic participant;
    determining a relevant path corridor that is assigned to the each determined future path;
    determining a shared traffic space as an overlap of the path corridors;
    calculating individual distance measures between the ego-vehicle and the shared traffic space and between the other traffic participant and the shared traffic space;
    evaluating the individual distance measures to determine an asymmetry;
    determining an intended passing order based on the asymmetry; and
    controlling to output signals that provide information on the intended passing order to the ego-vehicle driver.

16. A system for assisting operation of an ego-vehicle in the traffic situation with shared traffic space, comprising a processor configured to:

determine a future path for the ego-vehicle and a future path for another traffic participant;
determine a relevant path corridor that is assigned to the each determined future path;
determine an overlap of the path corridors to define a shared traffic space;
calculate individual distance measures between the ego-vehicle and the shared traffic space and between the other traffic participant and the shared traffic space;
evaluate the individual distance measures to determine an asymmetry;
determine an intended passing order based on the asymmetry;
determine a future trajectory for the ego-vehicle based on the intended passing order and generate control signals for executing automated or partially automated driving in accordance with the determined future trajectory; and
control to output signals that provide information on the intended passing order to the ego-vehicle driver.

17. A vehicle equipped with the system according to claim 16.

\* \* \* \* \*